United States Patent [19]

Yamanaka et al.

[11] Patent Number: 4,906,724
[45] Date of Patent: Mar. 6, 1990

[54] HIGH MODULUS POLYESTER FROM 4,4'-DIPHENYLDICARBOXYLIC ACID

[75] Inventors: Toru Yamanaka; Toshihide Inoue; Noriaki Goto, all of Aichi, Japan

[73] Assignee: Japan as represented by the Director General of Agency of Industrial Science and Technology, Japan

[21] Appl. No.: 275,075

[22] Filed: Nov. 22, 1988

[30] Foreign Application Priority Data

Apr. 11, 1988 [JP] Japan .................................. 63-87258

[51] Int. Cl.⁴ ........................ C08G 63/08; C08G 63/06
[52] U.S. Cl. .................................... 528/193; 528/176; 528/194
[58] Field of Search ............... 528/176, 194, 193, 190, 528/191

[56] References Cited

U.S. PATENT DOCUMENTS 3,778,410 12/1973 Kuhfuss et al. ...................... 528/190
3,975,487 8/1976 Cottis et al. ...................... 264/210 F
4,161,470 7/1979 Calundann .......................... 528/190

FOREIGN PATENT DOCUMENTS 6025046 4/1982 Japan .
0112620 5/1988 Japan .

OTHER PUBLICATIONS

W. J. Jackson Jr. et al., *J. Polymer Sci.*, 14, 2043–2058 (1976).

*Primary Examiner*—Harold D. Anderson
*Assistant Examiner*—T. Mason
*Attorney, Agent, or Firm*—Scully, Scott, Murphy & Presser

[57] ABSTRACT

A high modulus polyester molded article is obtained by molding an aromatic polyester which comprises at least one structural unit selected from the following structural units (I) to (III), the structural units (II)+(III) being less than 10 mol % of the structural units (I)+(II)+(III), and which is capable of forming anisotropic melt:

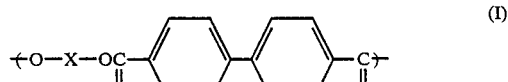

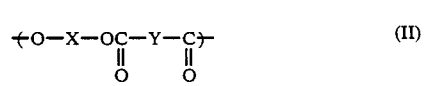

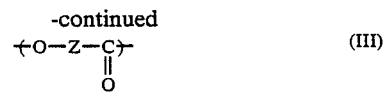

wherein X represents at least one group selected from

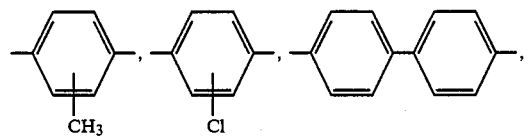

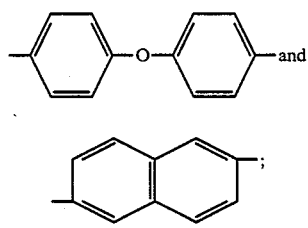

Y represents at least one group selected from

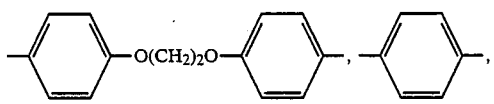

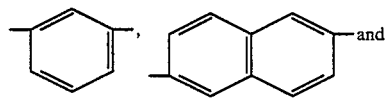

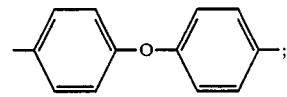

and Z represents at least one group selected from

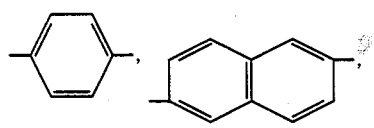

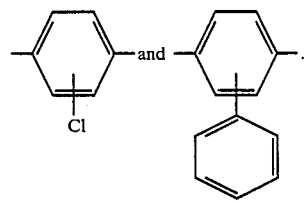

9 Claims, No Drawings

HIGH MODULUS POLYESTER FROM 4,4'-DIPHENYLDICARBOXYLIC ACID

BACKGROUND OF THE INVENTION

The present invention relates to a high modulus polyester molded article obtained by molding a high modulus polyester which forms anisotropic melt at a temperature lower than 450° C. and is capable of being subjected to melt molding.

DESCRIPTION OF THE PRIOR ART

Recently there have been an increasing demand for plastics of higher performance, and a lot of polymers exhibiting various novel performances have been developed and marketed. Above all, optically anisotropic liquid crystal polymers having a parallel arrangement of molecular chains are being noticed in that they have superior mechanical properties.

Widely known as such liquid crystal polymers are, for example, a polyester prepared by copolymerizing p-hydroxybenzoic acid with 4,4'-biphenol and terephthalic acid, a polyester prepared by copolymerizing p-hydroxybenzoic acid with 6-hydroxy-2-naphthoic acid, and a polyester prepared by copolymerizing p-hydroxybenzoic acid with polyethylene terephthalate (PET).

Further, as polyesters which should be capable of being subjected to melt molding and superior balancedly in both mechanical characteristics, e.g. modulus, and optical anisotropy, polyesters prepared from dihydroxy compounds, e.g. phenylhydroquinone, and 4,4'-diphenyldicarboxylic acid are disclosed in JP No.58-194949A, JP No.59-41329A, JP No.60-188421A, JP No.60-192724A, JP No.60-192725A and JP No.62-39620A, and polyesters prepared from p-hydroxybenzoic acid, dihydroxy compounds, e.g. phenylhydroquinone, and 4,4'-diphenyldicarboxylic acid are disclosed in JP NO. 59-41328A, JP No.61-10662A, JP No.62-20523A, JPNo. 62-39623A and JP No.62-48722A.

Indeed the polyesters exhibiting optical anisotropy, disclosed in the above prior art publications, afford spun yarns of high modulus, but in three-dimensional molded articles, e.g. injection-molded articles, since molecular chains are highly oriented in the flowing direction of the polymers, the flexural modulus in the direction perpendicular to the flowing direction is of a low value about the same as or even smaller than those of crystalline polymers not exhibiting liquid crystallinity such as, for example, polyethylene terephthalate and polybutylene terephthalate, although the flexural modulus in the flowing direction is high. Another problem is that molded articles of polymers having optical anisotropy are delaminated in their skin layers.

To solve such problems of dynamic anisotropy and delamination, there has heretofore been adopted a method of adding inorganic fillers such as glass fibers to liquid crystal polymers to mitigate anisotropy and prevent delamination. However, it became clear that the addition of such inorganic fillers would cause new problems such as lowering of impact strength and molding fluidity.

SUMMARY OF THE INVENTION

It is an object of the present invention to obtain molded articles having a high flexural modulus in both the polymer flowing direction and the direction perpendicular thereto.

It is another object of the present invention to obtain molded articles difficult to be delaminated without the addition of inorganic fillers.

Having made studies for achieving the above-mentioned objects, the present inventors found that those objects were attained by a molded article obtained by molding a polyester having as a principal component a structural unit derived from an aromatic dihydroxy compound of a specific structure and 4,4'-diphenyldicarboxylic acid. Thus we reached the present invention. More specifically, the present invention resides in a high modulus polyester molded article obtained by molding an aromatic polyester which comprises at least one structural unit selected from the following structural units (I) to (III), the structural units (II)+(III) being less than 10 mol % of the structural units (I)+(II)+(III), and which is capable of forming anisotropic melt:

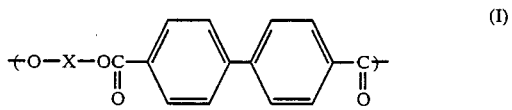  (I)

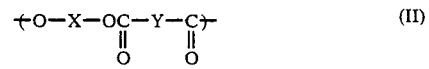  (II)

  (III)

wherein X represents at least one group selected from

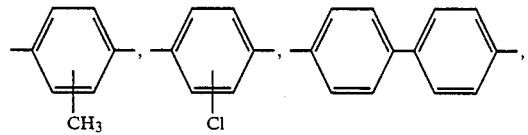

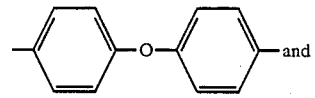

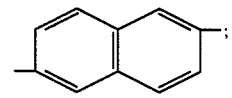

Y represents at least one group selected from

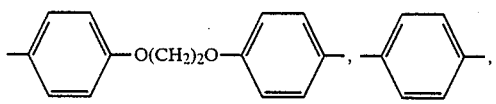

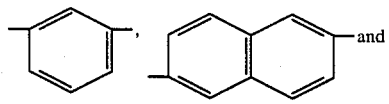

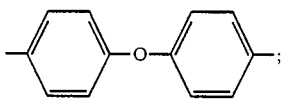

and Z represents at least one group selected from

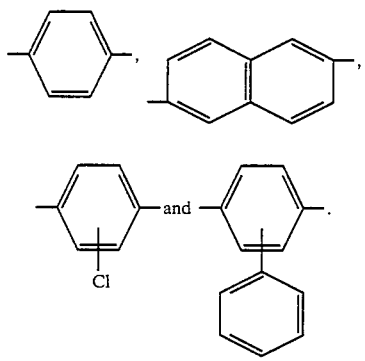

DESCRIPTION OF THE PREFERRED EMBODIMENTS

In the aromatic polyester used in the present invention, capable of forming anisotropic melt, the above structural unit (I) is derived from at least one dihydroxy compound selected from methylhydroquinone, chlorohydroquinone, 4,4'-dehydroxybiphenyl, 4,4'-dihydroxydiphenyl ether and 2,6-dihydroxynaphthalene, and 4,4'-dihenyldicarboxylic acid, The structural unit (II) is derived from at least one dihydroxy compound selected above and at least one dicarboxylic acid selected from 1,2-bis(phenoxy)ethane-4,4'-dicarboxylic acid, terephthalic acid, isophthalic acid, 2,6-naphthalenedicarboxylic acid and 4,4'-diphenyl ether dicarboxylic acid. The structural unit (III) is derived from at least one aromatic hydroxy carboxylic acid selected form p-hydroxybenzoic acid, 6-hydroxy-2-naphthoic acid, 3-chloro-4-hydroxybenzoic acid and 3-phenyl-4-hydroxybenzoic acid.

Among the dihydroxy compounds exemplified above for use in the structural units (I) and (II), methylhydroquinone, 4,4'-dihydroxybiphenyl and 2,6-dihydroxynaphthalene are particularly preferred.

Particularly preferred among the dicarboxylic acids exemplified above for use in the structural unit (II) are 1,2-bis(phenoxy)ethane-4,4'-dicarboxylic acid, 2,6-naphthalenedicarboxylic acid and terephthalic acid, with 2,6naphthalenedicarboxylic acid being still more preferable.

Among the aromatic hydroxycarboxylic acids exemplified above for use in the structural unit (III), p-hydroxybenzoic acid and 6-hydroxy-2-naphthoic acid are particularly preferred.

It is necessary that the proportion of the structural unit (I) be not less than 90 mol %, that is, the proportion of the structural units (II)+(III) be less than 10 mol % of (I)+(II)+(III). More preferably, the proportion of (I) is not less than 93 mol %, that is, (II)+(III) is less than 7 mol % of (I)+(II)+(III) is 10 mol % or more of (I)+(II)+(III), it will be impossible to attain the effects of the present invention.

A small amount of a dioxy compound, a dicarboxy compound, an oxycarboxylic acid, an aminocarboxylic acid, or p-phenylenediamine may be copolymerized with the above structural units.

Among the structural units of the anisotropic melt-forming aromatic polyester used in the present invention, the structural unit (I) is essential and it is presumed that the objects of the present invention are attained by a high intermolecular action of 4,4'-diphenyldicarboxylic acid which is one of the constituents of the structural unit (I).

The following (1)-(4) are typical examples of how to prepare the polyester used in the present invention.

(1) Preparation by polycondensation involving removal of monocarboxylic acid, from an aromatic diacyloxy compound or an aromatic acyloxy carboxylic acid and an aromatic dicarboxylic acid such as 4,4'-diphenyldicarboxylic acid.

(2) Preparation by polycondensation involving removal of acetic acid, from an aromatic dihydroxy compound or aromatic hydroxy carboxylic acid, an aromatic dicarboxylic acid such as 4,4'-diphenyldicarboxylic acid, and acetic anhydride.

(3) Preparation by polycondensation involving removal of phenol, from an aromatic dihydroxy compound, diphenyl ester of an aromatic dicarboxylic acid such as 4,4'-diphenyldicarboxylic acid and phenyl ester of an aromatic hydroxy carboxylic acid.

(4) Preparation by polycondensation involving removal of phenol, which comprises reacting a desired amount of diphenyl carbonate with an aromatic hydroxy carboxylic acid and an aromatic dicarboxylic acid such as 4,4'-diphenyldicarboxylic acid to obtain respective esters and then adding an aromatic dihydroxy compound.

Typical examples of catalyst used in the polycondensation include metallic compounds such as stannous acetate, tetrabutyl titanate, lead acetate, sodium acetate, potassium acetate, antimony trioxide, magnesium and trisodium phosphate. They are effective especially in the polycondensation involving removal of phenol.

Where the polyester used in the invention wherein the structural unit derived from 4,4'-diphenyldicarboxylic acid and an aromatic dihydroxy compound occupies not less than 90 mol % of 111 the structural units is to be prepared by the polycondensation involving removal of monocarboxylic acid described in the above (1) or (2), stirring is difficult because of a low bulk density of 4,4'-diphenyldicarboxylic acid and it may be impossible to obtain a homogeneous polymer due to crystallization during the polymerization. In this case, a good polymer can be obtained by any of the following methods (1)-(3).

(1) In polycondensation of an aromatic dihydroxy compound and acetic anhydride or a dicarboxylic acid wherein 90-100 mol % of all dicarboxylic acid components is 4,4'-diphenyldicarboxylic acid, a method involving a process wherein acetylation and initial polycondensation are performed in an inert gas atmosphere at a temperature in the range of 120° C. to 330° C. with stirring at a low speed not higher than 100 rpm.

(2) In polycondensation of a diester of an aromatic dihydroxy compound and a dicarboxylic acid wherein 90-100 mol % of all dicarboxylic acid components is 4,4'-diphenyldicarboxylic acid, a method involving a process wherein initial polycondensation is performed in an inert gas atmosphere at a temperature in the range of 120° C. to 330° C. with stirring at a low speed not higher than 100 rpm.

(3) A method involving a process wherein a reduced-pressure polycondensation is performed at a temperature not lower than 330° C. after the esterification reaction and initial polycondensation described in the above (1) or after the initial polycondensation described in the above (2).

The following method is also effective for obtaining a homogeneous polymer of a high degree of polymerization while preventing crystallization and solidification during polymerization. In polycondensation of an aromatic dihydroxy compound, acetic anhydride or a diester of an aromatic dihydroxy compound and a dicarboxylic acid wherein 90–100 mol % of all dicarboxylic acid components is 4,4′-diphenyldicarboxylic acid, polymerization is performed in an inert gas atmosphere and/or at reduced pressure at a temperature in the range of 120° C. to 400° C. to obtain a prepolymer having a melting point of 250-400° C. and a melt viscosity of 20–10,000 poise [a value measured at melting point +5° C., a shear rate of 1,000 (1/sec)], followed by a solid-phase polymerization to increase the degree of polymerization.

As examples of the inert gas used in the above methods there are mentioned nitrogen, helium and argon, with nitrogen being most preferred.

The "melting point" referred to above is of a value obtained using a differential scanning calorimeter and the "melt viscosity" also referred to above is of a value obtained at a shear rate of 1,000 (1/sec) using a flow tester.

The melt viscosity of the prepolymer is in the range of preferably 20 to 10,000 poise, more preferably 50 to 5,000 poise. If it is lower than 20 poise, it will be difficult to obtain a high degree of polymerization by the solid-phase polymerization, while in the case of a higher value than 10,000 poise, the prepolymer itself is often non-homogeneous due to crystallization, so both such values are undesirable.

It is preferable that the solid-phase polymerization of the prepolymer be carried out in an inert gas atmosphere or at reduced pressure and at a temperature lower by 20°–70° C. than the melting point of the prepolymer.

The apparatus for the solid-phase polymerization is not specially limited. For example, there may be used a stationary, tray type oven, a vacuum dryer, or a vacuum type rotary dryer.

Generally, the prepolymer is used in a pulverized state to increase the speed of the solid-phase polymerization. As the case may be, the prepolymer may be formed into a desired shape before the solid-phase polymerization. If the formed article of the prepolymer is heat-polymerized in solid phase, its strength will be enhanced.

The number average molecular weight of the high modulus polyester used in the present invention can be determined by hydrolyzing it with alkali under heating and quantitatively analyzing monocarboxylic acid or phenol as a polymer end group by gas chromatrography or by infrared absorption spectroscopy. It is preferable that the number average molecular weight of the high modulus polyester determined by such method is in the range of 2,000 to 80,000, particularly preferably 3,000 to 60,000. If the number average molecular weight is smaller than 2,000, mechanical characteristics, especially impact strength, will not be satisfactory, while if it is larger than 80,000, the polyester will be poor in melt fluidity.

The high modulus polyester used in the present invention is capable of forming anisotropic melt as previously noted, but it is preferable that the anisotropic melt formation initiating temperature be not higher than 400° C. Its melting point measured using a differential scanning calorimeter (DSC) is in the range of 300° to 450° C., preferably 320° to 420° C.

Further, the melt viscosity of the high modulus polyester used in the present invention is preferably in the range of $10^2$ to $10^6$ poise, more preferable $2 \times 10^2 - 5 \times 10^4$, as measured using a Koka type flow tester (Type 301, a product of Shimadzu Seisakusho Ltd.) under the conditions of a temperature of melting point +20° C. and a shear rate of 1,000 (1/sec).

The high modulus polyester used in the present invention is capable of being subjected to melt molding at a temperature not higher than 450° C. It can be subjected to a conventional melt molding such as extrusion, injection molding, compression molding, or blow molding, whereby it can be formed into fibers, films, three-dimensional molded articles, containers, hoses, etc.

Reinforcing agents such as glass fiber carbon fiber and asbestos, as well as additives such as filler, nucleating agent, pigment, antioxidant, stabilizer, plasticizer, lubricant, mold release agent and flame retardant, and other thermoplastic resins may be added to the high modulus polyester used in the present invention, to thereby impart a desired characteristic to the resulting molded article.

The molded article obtained using the high modulus polyester of the invention is not only extremely superior in mechanical properties but also less anisotropic dynamically and is difficult to cause delamination. . Where the high modulus polyester used in the present invention is subjected to injection molding, it is preferable that the crystal orientation degree of the resulting molded articles be not higher than 0.8, more preferably not higher than 0.75. Such an injection-molded article, for example, a flat plate molded through a side gate, is characterized by a high flexural modulus in the direction perpendicular to the polymer flowing direction. It is further characteristic in that delamination is difficult to occur because of a small difference in orientation degree between skin and core layers.

On the other hand, where the high modulus polyester used in the invention is subjected to extrusion, it is preferable that the crystal orientation degree be not lower than 0.8 and thus extremely high, unlike the injection-molded article. This extrudate is also characterized by having a small difference in orientation degree between skin and core layers and so being difficult to cause delamination.

The "crystal orientation degree" indicates an orientation function f, defined by the following equations (2)–(4) in wide-angle X-ray diffractiometry as described in J. Appl. Polym. Sci. 12, 2067 (1968). For evaluation of the orientation function f, there was used a square mean value of cosine of orientation angle defined by the following equation (1).

$$<\cos^2 \psi> = \frac{\int_0^{\frac{\pi}{2}} I(\psi) \cos^2 \psi \sin \psi \, d\psi}{\int_0^{\frac{\pi}{2}} I(\psi) \sin \psi \, d\psi} \quad (1)$$

In this connection, Gauss' function of the following formula (2) was assumed as a diffraction intensity distribution curve:

$$I(\psi) = (h/\sqrt{\pi}) e^{-h^2\psi^2} \quad (2)$$

From a half width H, (unit: radiant) of measured intensity distribution there was obtained a parameter h, according to the following equation (3) and the orientation function f, was determined according to the equation (1), (2) and (4).

$$H = \frac{\sqrt{\ln 2}}{h} = \frac{0.833}{h} \quad (3)$$

$$f = \frac{1}{2}(3 <\cos^2 \psi> - 1) \quad (4)$$

The orientation function f, is 1 in complete orientation 0 in random orientation.

Working examples and comparative examples will be given below to further illustrate the present invention.

EXAMPLE 1

208 parts by weight of methylhydroquinone diacetate, parts by weight of 4,4'-diphenyldicarboxylic acid and parts by weight of 2,6-naphthalenedicarboxylic acid were charged into a reaction vessel equipped with a stirrer and a distilling tube and there was performed polymerization involving removal of acetic acid. First, reaction was allowed to take place for 2 hours at 250-330° C. in a nitrogen gas atmosphere, thereafter for another 2 hours. Then, the temperature was raised to 380° C. and the polymerization was completed at reduced pressure. As a result, an almost theoretical amount of acetic acid was distilled off and there was obtained a polymer having the following theoretical structural formula:

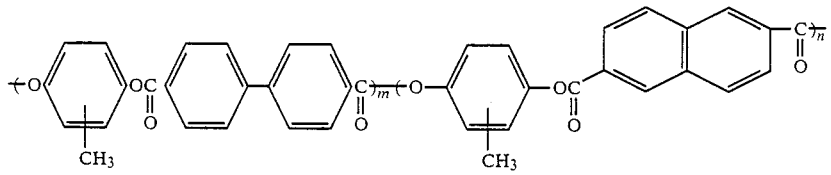

m/n = 95/5

The polymer was put on a sample stand of a polarizing microscope and the temperature was raised to check optical anisotropy. As a result, the polymer exhibited good optical anisotropy at temperatures above 330° C.

The melting point of the polymer was measured using DSC-II (a product of Perkin-Elmar Co.) to find that it was 365° C. Further, the polymer was found to have a melt viscosity of 1,600 poise at 375° C. and at a shear rate of 1,000 (1/sec).

The polymer was subjected to injection molding under the following conditions.

Using a Sumitomo-NESTAL promat injection molding machine (a product of Sumitomo Heavy Machine Industry Co., Ltd.) having a maximum mold clamping force of 25 tons, a maximum injection volume of 20.4 cc and a maximum injection pressure of 1,900 kgf/cm², the polymer prepared above was injection-molded through a side gate located centrally of one side at a cylinder temperature of 350°-380° C. and a nozzle temperature of 380° C. to obtain a flat plate of 70×70×1 mm.

The thus injection-molded article was cut into a size of 70×12.5×1 mm in parallel with the polymer flowing direction and the sample thus obtained was measured for crystal orientation degree by wide-angle X-ray diffractiometry in the flowing direction, which was found to be 0.556. Further, the flexural modulus of this sample was measured using TENSILON UTM4–200 (a product of Toyo-Baldwin Co., Ltd.); as a result, it was found to be 38.6 GPa. On the other hand, another sample of 70×12.5×1 mm was cut out in the direction perpendicular to the flowing direction and measured for flexural modulus, which was found to be as high as 7.9 GPa. A section of this injection-molded article was observed under a crossed nicol using a polarizing microscope to find that there was neither change in interference color nor difference in orientation degree between skin and core layers. Moreover, this injection-molded article was found difficult to cause frictional delamination.

EXAMPLE 2

229 parts by weight of methylhydroquinone diacetate and 242 parts by weight of 4,4'-diphenyldicarboxylic acid were charged into a reaction vessel equipped with a stirrer and a distilling tube and there was conducted polymerization involving removal of acetic acid.

First, the temperature was raised stepwise up to 330° C. in a nitrogen gas atmosphere and reaction was allowed to take place at 330° C. for 1.5 hours. Thereafter, the temperature was raised stepwise up to 380° C., and after the internal temperature of the system reached 380° C., the internal pressure of the system was reduced to 2 mmHg over a 20 minute period. In this vacuum there was performed reaction for 10 minutes to obtain a polymer (prepolymer) of a low polymerization degree having the following theoretical structural formula:

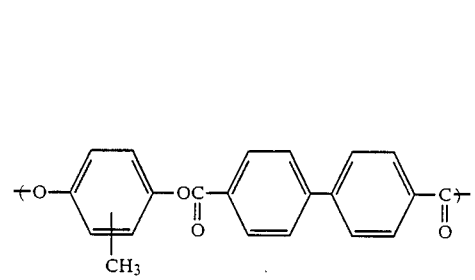

This polymer of a low polymerization degree was put on a sample stand of a polarizing microscope and observed for optical anisotropy with rise of temperature; as a result, it exhibited good optical anisotropy at temperatures above 323° C.

The melting point of the polymer was measured using DSC-II (a product of Perkin-Elmar Co.) to find that it was 360° C. Further, the polymer was found to have a melt viscosity of 1,100 poise at 365° C. and at a shear rate of 1,000 (1/sec).

The polymer was pulverized to not larger than 1 mm in diameter and then subjected to a solid-phase polymerization for 5 hours in a stationary type oven heated to 330° C. while passing nitrogen gas at a rate of 1.0 1 per minute. the melting point of the polymer after the solid-phase polymerization was 380° C. The polymer after the solid-phase polymerization was again determined for melt viscosity at 400° C. using a Koka type flow tester. As a result, the melt viscosity was found to be 4,500 poise at a shear rate of 1,000 (1/sec) and there was obtained an extremely strong gut. The polymer after the solid-phase polymerization was subjected to injection molding under the following conditions.

Using a Sumitomo-NESTAL promat injection molding machine (a product of Sumitomo Heavy Machine Industry Co., Ltd.) having a maximum clamping force of 25 tons, a maximum injection volume of 20.4 cc and a maximum injection pressure of 1,900 kgf/cm$^2$, the polymer was injection-molded through a side gate located centrally of one side at a cylinder temperature of 350°–410° C. and a nozzle temperature of 400° C. to obtain a flat plate of 70×70×1 mm. The molded article was cut into a size of 70×12.5×1 mm in parallel with the polymer flowing direction and the cut sample thus obtained was determined for crystal orientation degree by wide-angle X-ray diffractiometry, which was found to be 0.543. Further, the flexural modulus of this sample was measured using TENSILON UTM4-200 (a product of Toyo-Baldwin Co., Ltd.); as a result, it was found to be 37.7 GPa. On the other hand, another sample of 70×12.5×1 mm was cut out in the direction perpendicular to the flowing direction and measured for flexural modulus, which was found to be as high as 7.6 GPa. A section of this injection-molded article was observed under a crossed nicol using a polarizing microscope to find that there was neither change in interference color nor difference in orientation degree between skin and core layers. Moreover, this injection-molded article was found difficult to cause frictional delamination.

EXAMPLE 3-19

Diacetoxy compounds of methylhydroquinone diacetate (I), chlorohydroquinone diacetate (II), 4,4'-diacetoxybiphenyl (III), 4,4'-diacetoxydiphenyl ether (IV) and 2,6-diacetoxynaphthalene (V), dicarboxy compounds of 4,4'-diphenyldicarboxylic acid (VI), 1,2-bis(phenoxy)ethane4,4'-dicarboxylic acid (VII), terephthalic acid (VIII), isophthalic acid (IX) and 4,4'-diphenyl ether dicarboxylic acid (X), and p-acetoxybenzoic acid (XI), 6-acetoxy-2-naphthoic acid (XII), 4-acetoxy-3-chlorobenzoic acid (XIII) and 4-acetoxy-3-phenylbenzoic acid (XIV), were charged in such proportions as shown in Table 1 into the same reaction vessel as that described in Example 1 and polycondensation was performed under the same conditions as in Example 1. The resulting polymer was subjected to injection molding and the molded article was measured for crystal orientation degree and flexural modulus in both the flowing direction and the direction perpendicular thereto. The results are as set forth in Table 1.

The injection-molded articles obtained above were found to be high in flexural modulus in the perpendicular direction and difficult to cause frictional delamination.

TABLE 1

| Ex. | (I) | (II) | (III) | (IV) | (V) | (VI) | (VII) | (VIII) | (IX) | (X) | (XI) | (XII) | (XIII) | (XIV) | $1-\frac{[(VI)-(X)]+[(XI)-(XIV)]}{(VI)}$ | M.P. (°C.) | C.O.D. | Flexural Modulus F.D. | P.D. |
|---|---|---|---|---|---|---|---|---|---|---|---|---|---|---|---|---|---|---|---|
| 3 | 1.0 | — | — | — | — | 0.95 | 0.05 | — | — | — | — | — | — | — | 0.05 | 360 | 0.712 | 36.3 | 6.8 |
| 4 | 1.0 | — | — | — | — | 0.95 | — | 0.05 | — | — | — | — | — | — | 0.05 | 380 | 0.760 | 32.0 | 6.4 |
| 5 | 1.0 | — | — | — | — | 0.95 | — | — | 0.05 | — | — | — | — | — | 0.05 | 371 | 0.726 | 30.8 | 6.0 |
| 6 | 1.0 | — | — | — | — | 0.95 | — | — | — | 0.05 | — | — | — | — | 0.05 | 368 | 0.671 | 32.8 | 6.9 |
| 7 | 0.9 | 0.1 | — | — | — | 1.0 | — | — | — | — | — | — | — | — | 0 | 358 | 0.730 | 38.9 | 5.6 |
| 8 | 0.95 | — | 0.05 | — | — | 1.0 | — | — | — | — | — | — | — | — | 0 | 360 | 0.662 | 36.3 | 6.7 |
| 9 | 0.95 | — | — | 0.05 | — | 1.0 | — | — | — | — | — | — | — | — | 0 | 362 | 0.683 | 35.0 | 6.2 |
| 10 | 0.95 | — | — | — | 0.05 | 1.0 | — | — | — | — | — | — | — | — | 0 | 368 | 0.626 | 39.0 | 6.3 |
| 11 | 0.95 | — | — | — | — | 0.95 | — | — | — | — | 0.05 | — | — | — | 0.05 | 356 | 0.650 | 30.5 | 5.8 |
| 12 | 0.95 | — | — | — | — | 0.95 | — | — | — | — | — | 0.05 | — | — | 0.05 | 350 | 0.702 | 33.0 | 6.0 |
| 13 | 0.95 | — | — | — | — | 0.95 | — | — | — | — | — | — | 0.05 | — | 0.05 | 358 | 0.723 | 37.2 | 5.9 |
| 14 | 0.95 | — | — | — | — | 0.95 | — | — | — | — | — | — | — | 0.05 | 0.05 | 355 | 0.738 | 36.0 | 5.8 |
| 15 | — | 0.7 | 0.3 | — | — | 1.0 | — | — | — | — | — | — | — | — | 0 | 299 | 0.709 | 32.9 | 6.2 |
| 16 | — | 0.7 | — | 0.3 | — | 1.0 | — | — | — | — | — | — | — | — | 0 | 295 | 0.723 | 33.0 | 6.4 |
| 17 | — | — | 0.3 | — | 0.7 | 1.0 | — | — | — | — | — | — | — | — | 0 | 377 | 0.651 | 38.1 | 6.4 |
| 18 | — | — | — | 0.3 | 0.7 | 1.0 | — | — | — | — | — | — | — | — | 0 | 348 | 0.689 | 37.2 | 6.0 |
| 19 | — | — | 0.25 | — | 0.7 | 0.95 | — | — | — | — | 0.05 | — | — | — | 0.05 | 366 | 0.662 | 37.9 | 6.3 |

Note:
M.P. = Melting Point
C.O.D. = Crystal Orientation Degree
F.D. = Flowing Direction
P.D. = Perpendicular Direction

COMPARATIVE EXAMPLE 1

Using methylhydroquinone diacetate and 4,4'-diphenyldicarboxylic acid and 2,6-naphthalenedicarboxylic acid, a polymer having the following theoretical structural formula was prepared in the same way as in Example 1:

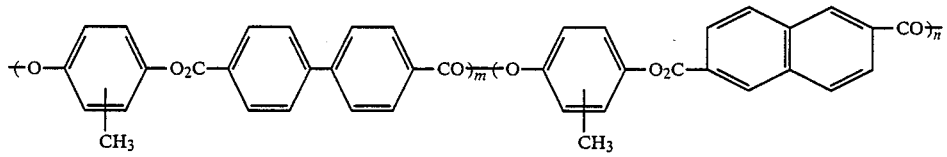

m/n = 85/15

The polymer exhibited optical anisotropy at temperatures above 275° C. Its melting point was 278° C. and melt viscosity at 288° C. was 2,800 poise at a shear rate of 1,000 (1/sec). Then, using the same injection molding machine and mold as in Example 1, the polymer was injection-molded at a cylinder temperature of 300°–320° C. and a nozzle temperature of 320° C. to obtain an injection-molded article (flat plate) of 70×70×1 mm.

The injection-molded article thus obtained was measured for flexural modulus in the same manner as in Example 1; the results were 38 GPa and 4.3 GPa in the flowing direction and in the direction perpendicular thereto, respectively, and thus the flexural modulus in the perpendicular direction was low. It was then observed through a transmission polarizing microscope to find that the difference in crystal orientation degree was larger than in the molded articles obtained in Examples 1 and 2.

Further, on rubbing, the skin layer of this injection-molded article peeled off relatively easily and there easily occurred delamination.

EXAMPLE 20

A polymer was prepared in the same way as in Example 1. It was then get to a Koka type flow tester (Type 301, a product of Shimadzu Seisakusho Ltd.) and gut was extruded through a spinneret orifice of 0.5 mm in diameter at a temperature 10° C. higher than the melting point of the polymer. The gut thus obtained was determined for crystal orientation degree in the extrusion direction by X-ray diffractiometry, which was found to be 0.97.

A vertical section of the gut thus obtained was observed under a crossed nicol using a polarizing microscope. As a result, difference was observed neither in interference color nor in crystal orientation degree between skin and core layers of the gut. Further, this extruded gut proved difficult to cause frictional delamination.

COMPARATIVE EXAMPLE 2

A polymer was prepared by polymerization in the same way as in Comparative Example 1. it was then fed to a Koka type flow tester (Type 301, a product of Shimadzu Seisakusho Ltd.) and gut was extruded through a spinneret orifice of 0.5 mm in diameter at a temperature 10° C. higher than the melting point of the polymer. A vertical section of the thus-extruded gut was observed under a crossed nicol using a polarizing microscope to find that the difference in crystal orientation degree between skin and core layers was larger than that of the extruded gut obtained in Example 20.

Further, on rubbing, the skin layer of the extruded gut just obtained above peeled off relatively easily and there occurred delamination.

COMPARATIVE EXAMPLE 3

A polymer having the following theoretical structural formula was prepared using p-acetoxybenzoic acid and 6-acetoxy-2-naphthoic acid:

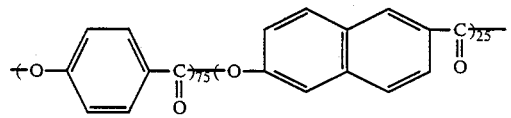

The polymer exhibited optical anisotropy at temperatures above 251° C. Its melting point was 280° C. and melt viscosity at 290° C. was 2,800 poise at a shear rate of 1,000 (1/sec). Then, using the same injection molding machine and mold as in Example 1, the polymer was injection-molded at a cylinder temperature of 260°–300° C. and a nozzle temperature of 300° C. to obtain an injection-molded article (flat plate) of 70×70×1 mm.

The injection-molded article thus obtained was measured for flexural modulus in the same manner as in Example 1; the results were 20.2 GPa and 2.2 GPa in the flowing direction and in the direction perpendicular thereto, respectively, and thus the elastic modulus in the perpendicular direction was extremely low. Further, its crystal orientation degree in the flowing direction was determined by wide-angle X-ray diffractiometry and found to be 0.854. Then, a section of this injection-molded article was observed under a crossed nicol using a polarizing microscope; as a result, a clear change in interference color and a great difference in crystal orientation degree were observed between skin and core layers. Further, on rubber, the skin layer of this injection-molded article peeled off easily and there easily occurred delamination.

We claim:

1. A high modulus polyester molded article obtained by molding an aromatic polyester which comprises at least one structural unit selected from the following structural units (I) to (III), the structural units (II)+(III) being less than 10 mol % of the structural units (I)+(II)+(III), and which is capable of forming anisotropic melt:

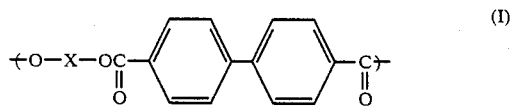
(I)

$$\mathrm{+O-X-O\underset{\underset{O}{\|}}{C}-Y-\underset{\underset{O}{\|}}{C}+} \quad \text{(II)}$$

$$\mathrm{+O-Z-\underset{\underset{O}{\|}}{C}+} \quad \text{(III)}$$

wherein X represents at least one group selected from

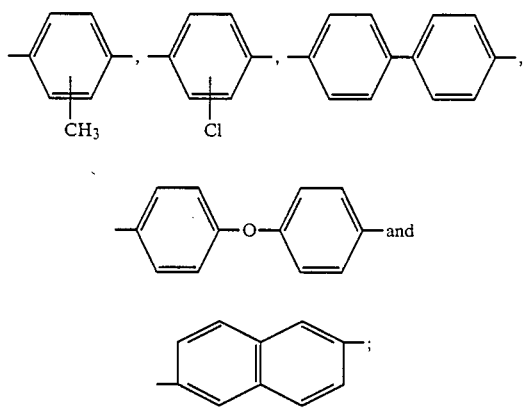

Y represents at least one group selected from

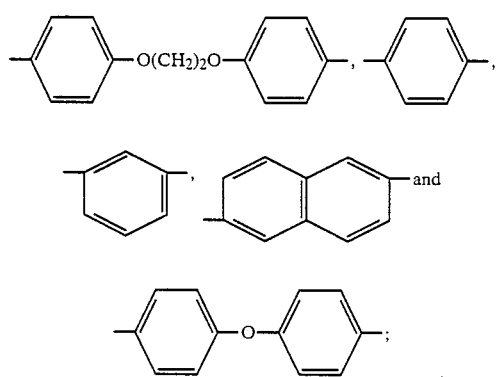

at least one group selected from

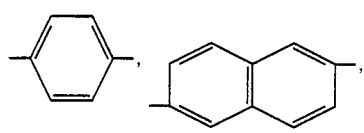

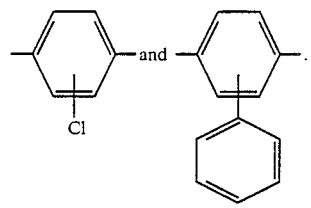

2. A polyester molded article as set forth claim 1, wherein Y in the structural unit (II) is at least one group selected from

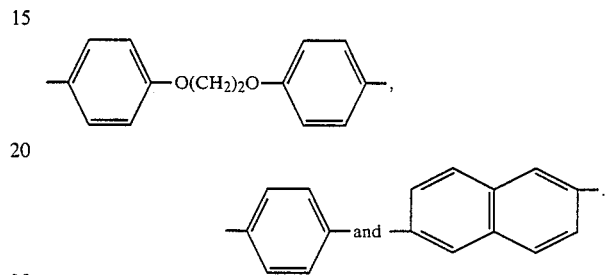

3. A polyester molded article as set forth in claim 1, wherein Y in the structural unit (II) is

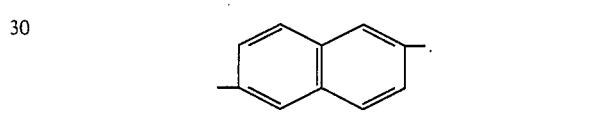

4. A polyester molded article as set forth in claim 1, wherein the proportion of the structural units (II)+(III) is less than 7 mol % of the structural units (I)+(II)+-(III).

5. A polyester molded article as set forth in claim 1, which is an injection-molded article having a crystal orientation degree not higher than 0.80.

6. A polyester molded article as set forth in claim 1, which is an injection-molded article having a crystal orientation degree not higher than 0.75.

7. A polyester molded article as set forth in claim 1, which is an extruded article having a crystal orientation degree in the extrusion direction of not lower than 0.80.

8. A polyester molded article as set forth in claim 1, wherein the aromatic polyester has a number average molecular weight in the range of 2,000 to 80,000.

9. A polyester molded article as set forth in claim 1, wherein the aromatic polyester has a number average molecular weight in the range of 3,000 to 60,000.

* * * * *

UNITED STATES PATENT AND TRADEMARK OFFICE
CERTIFICATE OF CORRECTION

PATENT NO. : 4,906,724

DATED : March 6, 1990

INVENTOR(S) : Toru Yamanaka, et al.

It is certified that error appears in the above-identified patent and that said Letters Patent is hereby corrected as shown below:

Column 4, line 44: "lll" should read as --all--

Column 7, line 26: "parts" should read as --230 parts--

Column 7, line 27: "parts" should read as --108 parts--

Column 15, line 46, Claim 1: insert --; and Z represents-- before "at least"

Signed and Sealed this

Second Day of July, 1991

Attest:

HARRY F. MANBECK, JR.

Attesting Officer

Commissioner of Patents and Trademarks